United States Patent Office

3,518,525
Patented June 30, 1970

3,518,525
SYSTEM PROVIDING A D.C. VOLTAGE EQUAL TO THE R.M.S. VALUE OF AN UNKNOWN A.C. VOLTAGE
James J. Duckworth, Bridgeport, Norbert Schnog, Westport, and Alfred B. Muller, Trumbull, Conn., assignors to The Singer Company, New York, N.Y., a corporation of New Jersey
Filed July 19, 1968, Ser. No. 746,054
Int. Cl. G01r 5/26
U.S. Cl. 321—1.5
4 Claims

ABSTRACT OF THE DISCLOSURE

An unknown A.C. voltage is applied to the input heater of a thermal converter and a D.C. voltage appears at the output thereof of a value related to the R.M.S. value of the input voltage. This output voltage is opposed by a reference D.C. voltage incrementally developed across a precision resistor. The error or difference between these opposed voltages is amplified and applied to a level comparator which operates a gating circuit to command clock signals to operate a reversible pulse counter to count up or down depending on the sense of the error. The counter switches connections between a resistance ladder summing network and a reference voltage to supply an output voltage which varies incrementally for each count. This output voltage is passed through a buffer amplifier and applied to the precision resistor as the reference D.C. voltage opposing the output voltage from the thermal converter. When a voltage balance is reached, the counter stops counting and the voltage produced by the counting process is the fixed value appearing across the precision resistor. A short time after and responsively to the voltage balance reached as signaled by the counter stopping, a transfer switch is automatically operated to remove the unknown A.C. voltage from the input of the thermal converter and to substitute therefor a variable D.C. voltage obtained from a D.C. amplifier having an input signal equal to the difference between the reference voltage now fixed across the precision resistor and the output voltage of the thermal converter due to the input voltage now supplied by the output of the D.C. amplifier. Thus the D.C. amplifier, by negative feedback servo action, reaches an output level at which the net input is zero. Under these conditions the output of the D.C. amplifier is equal to the R.M.S. value of the original unknown A.C. input voltage.

Background of the invention

In prior art systems for making A.C. voltage measurements on a true R.M.S. basis it has generally been necessary to make a null measurement manually by observing the null condition visually on a meter. This is inconvenient with respect to the time required to adjust the circuit and is inaccurate with respect to drift occurring in the time required to establish the null reading. Prior art systems have been devised for automatic nulling with respect to a D.C. memory voltage stored in a capacitor but these systems have proved to be inaccurate due to the drift in the memory voltage due to inherent leakage.

Summary of the invention

It is therefore an object of this invention to provide an automatic self-balancing A.C.-D.C. transfer standard which overcomes the disadvantages of the prior art systems described above. In carrying out the objects of this invention all switching and balancing is fast and automatic, and the operator does not handle any controls. Thus, the human factor is completely removed from the measurement.

According to the present invention, a thermal converter is used as the basic measuring device and its output is compared with a memory voltage developed across a precision resistor. The memory system functions as a tracking type analog to digital converter using a bidirectional counting system having a resistance ladder summing network supplied by a stable reference voltage to quickly establish a fixed memory voltage. As soon as the memory voltage is established as signaled by the counter stopping, a feedback loop is automatically established to cause a D.C. substitution voltage to automatically bring the thermal converter heater to the same temperature as when the unknown A.C. voltage was applied and when this loop is balanced the substituted D.C. voltage is the same as the R.M.S. value of the unknown A.C. voltage and may be read out by any suitable means.

The time taken to establish the memory voltage and to balance the substitution D.C. voltage is very short and the total time for an A.C.-D.C. transfer by the system of the present invention is typically less than ten seconds.

Figure 1:
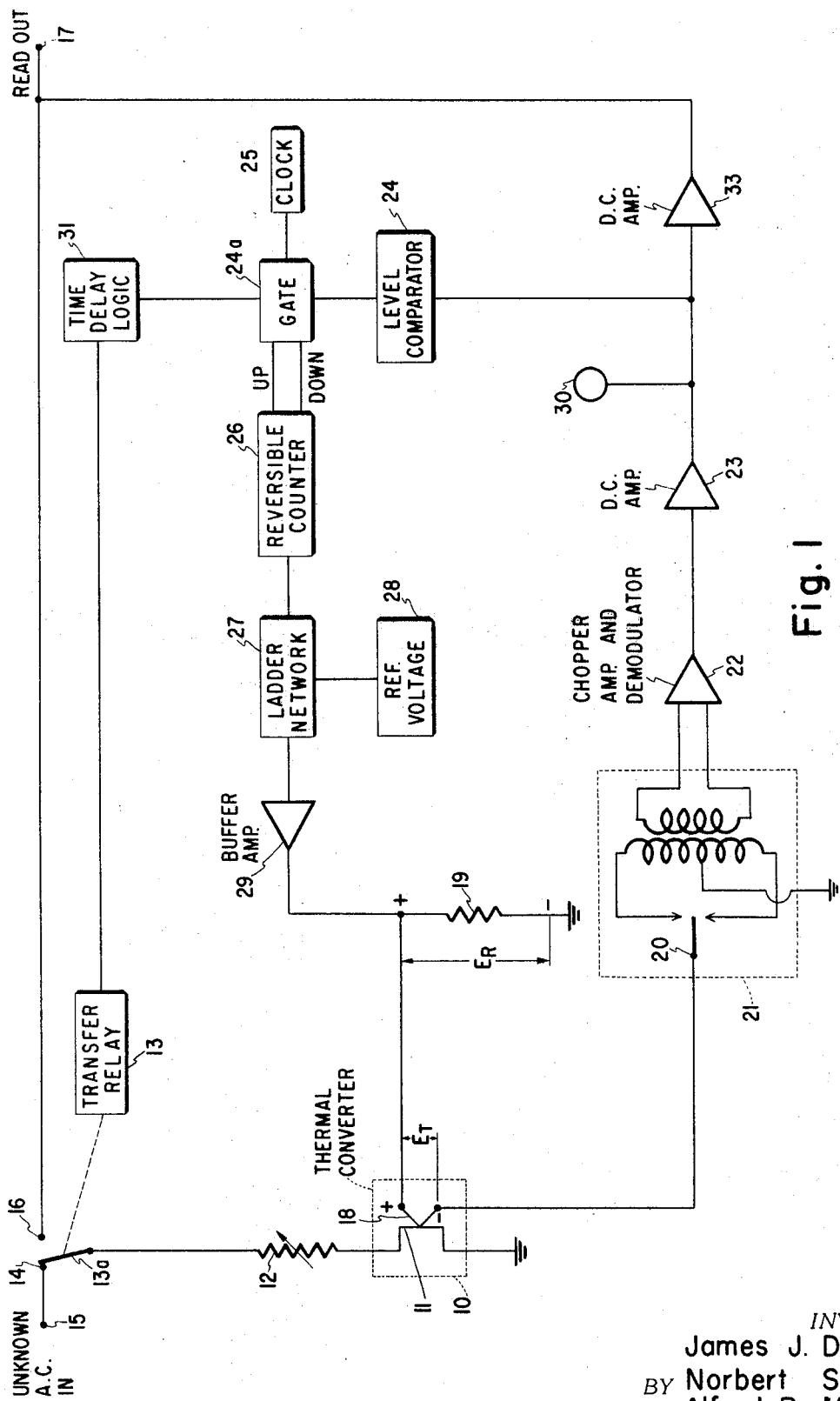
Figure 2:
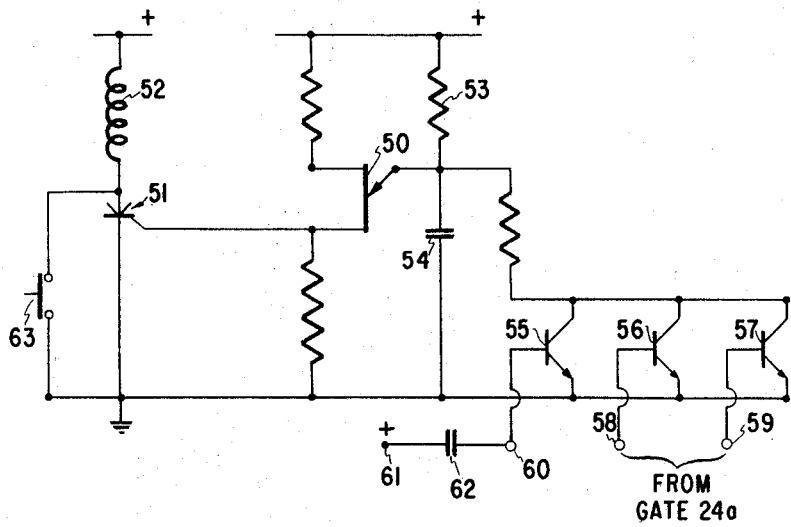

In the drawings, FIG. 1 is a schematic block diagram illustrating an embodiment of the system of this invention. FIG. 2 is a detailed diagram of the logic circuit used in the system of this invention to accomplish the automatic transfer function.

Description of preferred embodiment

Referring now to FIG. 1 a conventional thermal converter indicated generally by 10 has a heater element 11 connected between ground and through a series resistance range-adjusting attenuator 12 to the movable contact 13a of a single-pole double-throw transfer relay 13. The relay 13 has a first stationary contact 14 connected to the A.C. input terminal 15, and a second stationary contact 16 connected to a D.C. output terminal 17. The thermal converter 10 also includes a thermocouple element 18 connected at one end to a precision resistor 19 and at the other end to the input terminal 20 of a conventional chopper 21. The D.C. voltage $E_T$ generated by the thermocouple element 18 will have the polarity shown and means presently to be described develops a D.C. voltage $E_R$ across the resistor 19 of the polarity shown. Thus the input voltage to the chopper 21 is the difference or error between the voltages $E_T$ and $E_R$. The chopper converts the D.C. error voltage to an A.C. voltage modulated by the error value. This voltage is amplified and demodulated in the chopper amplifier 22 and is further amplified in the D.C. amplifier 23 and then is presented to a level comparator 24 which controls a gate 24a. The level comparator senses the input level with respect to ground. If the level is above ground it gates pulses from a clock generator 25 to drive a reversible counter 26 to count *up* and if the level is below ground it gates pulses from clock 25 to drive the counter 26 to count *down*. If the input signal to comparator 24 remains at ground, indicating no error, the gates remain open and the counter stops counting.

The counter output provides controlled switching pulses for connecting a resistance ladder network 27 to a reference voltage source 28 to produce an output voltage which varies incrementally as the counting proceeds. This output voltage is amplified in a buffer amplifier 29 and applied to the precision resistor 19 as a voltage bucking the voltage output of the thermocouple 18. The ladder network 27 combined with buffer amplifier 29 and resistor 19 thus becomes a voltage register for storing a stable memory voltage equal to the D.C. voltage output of the thermal converter produced by the unknown A.C. voltage.

The above elements, taken together, comprise an auto-balance loop for establishing a memory voltage which is as stable as a regulated reference voltage can be made and which does not depend on any adverse capacitor storage effects. The individual elements are well known in the art, but their combination in accordance with this invention is novel. For example, the level comparator may be of the type shown and described in paragraph 15–5, page 465 of "Pulse and Digital Circuits," New York, 1956. The gating circuits may be any of several described in the above publication in chapter 15 beginning at page 392. The reversible counter may be of the type described on page 335 of the same publication. The ladder or summing network 27 may be of the type disclosed in the Seid et al. expired U.S. Pat. No. 2,537,427 for storing a voltage proportional to the number stored in a counter.

Thus far there has been described a system for establishing a D.C. voltage across resistor 19 which is equal to the output voltage from the thermocouple 18, and a null-meter 30 connected as shown will indicate zero voltage at balance.

It now becomes necessary to substitute for the A.C. unknown voltage a D.C. voltage which produces at the thermocouple 18 a voltage equal to the memory voltage fixed across resistor 19. To accomplish this within a minimum time from the establishment of the fixed memory voltage is the purpose of the remainder of the system of this invention now to be described.

The logic used here is that if the counter, when tracking the input voltage level does not receive a command to count for a short but predetermined length of time, it is assumed that a balance has been reached and the system is ready for the automatic D.C. voltage substitution. To this end, a time delay logic circuit 31 connected to receive gating pulses from the gate 24a operates to energize the transfer relay 13 if the counter stops counting for a predetermined period of time equal, say, to five seconds. At the end of that time and if no count pulse is produced, the transfer relay 13 is operated and the movable contact 13a is moved into engagement with the stationary contact 16.

It will be seen that the D.C. amplifier 33, now driven by the memory voltage, supplies an output D.C. voltage which is applied to the heater 11 to develop in the thermocouple 18 a negative feedback voltage with respect to the memory voltage across resistor 19. This output voltage will quickly stabilize at a D.C. level equal to the R.M.S. value of the original unknown A.C. voltage because the same conditions of balance are obtained and the unknown value can be read out by any suitable measuring device connected to the D.C. output terminal 17.

While any suitable time delay circuit may be used to perform the logic required, one circuit actually used successfully in the system of this invention will be described.

Referring to FIG. 2, a unijunction transistor (UJT) 50 is shown connected as a conventional relaxation oscillator to furnish trigger pulses to an SCR 51 which, when fired, energizes coil 52 of the transfer relay 13 and moves contact 13a into engagement with contact 16. As is well known in this art, the resistance 53 and capacitor 54 can be chosen to establish a predetermined trigger oscillation period. Transistors 55, 56 and 57 are connected as a NOR gate so that capacitor 54 is effectively discharged if any one of the transistors is turned on and no trigger pulses are generated and the SCR remains non-conducting with coil 52 deenergized.

The terminals 58 and 59 are connected to receive the up and down counter gating pulses from gate 24a and with the termination of the last counter pulse either to terminal 58 or 59, the transistors are all cut off, capacitor 54 starts to charge through resistance 53 and, after a predetermined time delay, say five seconds, if no further gating pulses are received, SCR 51 will be triggered and relay coil 52 energized to move contact 13a into engagement with contact 16. After relay coil 52 is energized, the UJT relaxation oscillator may be disabled by turning on transistor 55 by connecting the terminal 60 to a source 61 of positive potential, for example, through normally-open contacts 62 of relay 13. With triggering pulses thus removed from the SCR 51, it can then be reset to cut-off condition by momentarily shorting the anode-cathode circuit by reset push-button 63.

It will be evident from the above that there is provided according to this invention a system for automatically providing quickly and accurately by transfer method a D.C. voltage equal to the R.M.S. value of an unknown A.C. voltage requiring no operator techniques or human decisions. Particularly important to the system of this invention is the attainment of a true memory voltage without capacitor storage and a logic decision that balance has been reached and automatic transfer to the D.C. mode.

Having thus set forth the nature of this invention, what is claimed herein is:

1. A system for providing a D.C. voltage equal to the R.M.S. value of an unknown A.C. voltage comprising:
   (a) a thermal converter having an input and an output,
   (b) means connecting the unknown A.C. voltage to the input of the thermal converter to derive an output signal therefrom,
   (c) means supplying an incrementally varying signal and comparing said incrementally varying signal with said output signal from the thermal converter to derive a control signal proportional to their difference,
   (d) means responsively to said control signal to incrementally increase or decrease said varying signal until a balanced condition is reached between the output signal and the varying signal,
   (e) means automatically responsively to the attainment of said balanced condition for storing said varying signal at the value reached and for removing the A.C. voltage from the input of the thermal converter, and
   (f) means automatically developing a D.C. signal at the input of the thermal converter having a level such that the output signal of the thermal converter equals the stored signal.

2. A system for providing a D.C. voltage equal to the R.M.S. value of an unknown A.C. voltage comprising:
   (a) a thermal converter having an input and an output,
   (b) means connecting the unknown A.C. voltage to the input of the thermal converter to derive an output signal therefrom,
   (c) a reversible pulse counter,
   (d) means generating a pulse train,
   (e) gating means to apply said pulse train to said counter to count up or down,
   (f) means to develop a signal which varies incrementally in response to each count,
   (g) comparator means to develop control signals responsively to the difference between the output signal from the thermal converter and the incrementally varying signal,
   (h) said gating means being actuated by said control signals to command the counter to count in a direction to bring the incrementally varying signal to a value equal to the output signal,
   (i) switching means operative responsively to the cessation of the counting process for a predetermined time to remove the A.C. voltage from the input to the thermal converter and to substitute therefore an adjustable D.C. voltage, and
   (j) means for adjusting the D.C. voltage to establish an output signal from the thermal converter equal to the value of the incrementally varying signal reached at the cessation of the counting process.

3. A system in accordance with claim 2 in which the switching means comprises:
(a) transfer relay,
(b) a silicon controlled rectifier for energizing said relay,
(c) a pulse generator for triggering said rectifier, and
(d) a NOR gate for inhibiting the operation of the pulse generator responsively to gating pulses applied to the pulse counter.

4. A system in accordance with claim 2 in which the means developing the incrementally varying signal comprises:
(a) a resistance ladder network,
(b) a source of reference potential,
(c) means responsively to the pulse counter to connect the reference potential to the ladder network in a predetermined sequential manner to produce the incrementally varying signal at the output thereof.

References Cited
UNITED STATES PATENTS

| | | | |
|---|---|---|---|
| 2,805,394 | 9/1957 | Hermach | 324—106 |
| 3,258,691 | 6/1966 | De Witt et al. | 321—1.5 X |
| 3,273,059 | 9/1966 | Andresen et al. | 324—106 |
| 3,303,423 | 2/1967 | Staschover et al. | 324—106 |

LEE T. HIX, Primary Examiner

W. H. BEHA, Jr., Assistant Examiner

U.S. Cl. X.R.

324—106, 111